March 3, 1970  C. B. GOODSTEIN  3,498,175
PULL TYPE BLIND FASTENER
Filed Aug. 29, 1968

INVENTOR.
CHARLES B. GOODSTEIN
BY
*McCormick, Paulding & Huber*
ATTORNEYS

United States Patent Office 3,498,175
Patented Mar. 3, 1970

3,498,175
PULL TYPE BLIND FASTENER
Charles B. Goodstein, Buff Cap Road,
Tolland, Conn. 06084
Filed Aug. 29, 1968, Ser. No. 756,239
Int. Cl. F16b *19/00, 5/00*
U.S. Cl. 85—85      6 Claims

ABSTRACT OF THE DISCLOSURE

A blind fastener has a shank portion with inner and outer parallel legs. The inner legs are connected to one another and define a triangular nose portion at their lower ends. These inner leg portions also extend upwardly and define a head portion of the fastener with pull tabs which serve to lift the nose portion to spread the outer shank legs and anchor the fastener in a panel opening or the like.

Summary of invention

This invention relates to pull type blind fasteners, and deals more particularly with a fastener which is adapted for insertion in an opening in one or more panels wherein only one side of the uppermost panel is accessible for setting of the fastener.

The general object of the present invention is to provide a blind fastener of malleable sheet material which can be easily inserted in an aperture in a panel or the like and can be readily set to clamp the opposite surfaces of the panel for securing the fastener therein.

A more specific object of the present invention is to provide a blind fastener of unitary construction which can be set by means of a simple pulling action on the head portion of the fastener.

Still another object of the present invention is to provide a novel one-piece sheet metal fastening device of the above-described type which is of economical construction, and which may be mass produced by utilizing simple stamping and bending operations.

Detailed description

Figure 1:
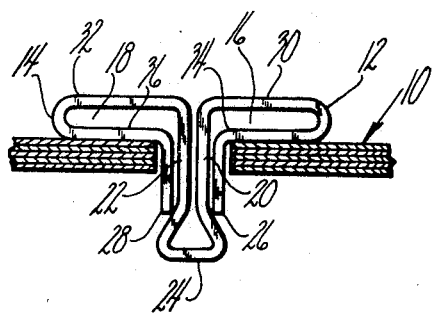
FIG. 1 is an elevational view of the undeformed fastener inserted in an opening defined by several panels to be joined.

Turning now to a more detailed description of the embodiment shown in the drawings, FIG. 1 shows a one-piece fastener of sheet metal construction which has been stamped and bent to form a shape which can be conveniently inserted in an opening defined by a plurality of panels indicated generally at 10. The fastener shown includes a head portion which is defined by laterally outwardly protruding portions 12 and 14 which define openings 16 and 18 respectively. The shank portion of the fastener comprises inner leg portions 20 and 22 which are connected to one another adjacent their lower ends by a generally triangular shaped nose portion 24. The shank portion of the fastener also includes depending outer leg portions 26 and 28 which extend downwardly alongside the inner leg portions 20 and 22 respectively for engagement by the nose portion 24 when the latter is pulled upwardly in response to raising or lifting of the laterally outwardly extending head portions 12 and 14 in a manner to be described in greater detail hereinbelow.

Considering the head portion of the fastener shown in FIG. 1 in greater detail, the laterally outwardly extending portions 12 and 14 are more particularly defined by upper and lower pairs of leg portions 30, 32 and 34, 36 respectively which cooperate to define the above-mentioned openings 16 and 18. As seen in the undeformed condition of the fastener, shown in FIG. 1, the inner ends of the upper leg portions 30 and 32 are connected to the upper ends of the inner shank leg portions 20 and 22 respectively at a right angle bend. Thus, the right angle bend between the upper head leg portions 30 and 32 and the inner shank leg portions, 20 and 22 respectively, define tab portions of the fastener which can be raised by a suitable camming tool such as that shown in FIG. 2 for deforming or setting the fastener from its initial position as shown in FIG. 1 to an anchored position as shown in FIG. 3.

Figure 3:
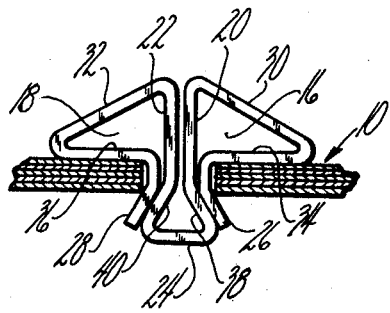
FIG. 3 is an elevational view of the FIG. 1 fastener after it has been set by a tool of the type shown in FIG. 2.

From FIG. 3 it will be apparent that this raising or lifting action of the tab portions causes the depending triangular nose portion 24 to cam or deform the outer shank leg portions 26 and 28 laterally outwardly from the position shown in FIG. 1 to that shown in FIG. 3, whereby the fastener is anchored to the panel or panels 10. More particularly, the nose portion of the fastener includes a blunt lower portion which defines one leg of the triangle, and includes upwardly and inwardly inclined side portions 38 and 40 connected at their lower ends to said blunt lower portion of the nose 24. The upper ends of these inclined side portions 38 and 40 are connected to the inner shank leg portions 20 and 22 as mentioned above.

Figure 2:
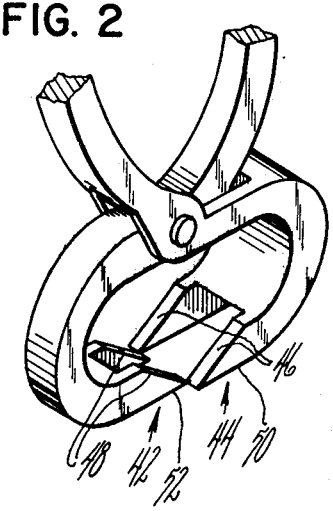
FIG. 2 is a perspective view of one type of camming tool which might be used to set the fastener of FIG. 1.

While any suitable mechanism or tool might be used for so setting the fastener shown in FIGS. 1 and 3, the pliers shown in FIG. 2 has been found especially well suited for manually setting of the fastener. These pliers comprise movable jaw elements 42 and 44 which can be moved inwardly toward one another to fit in the openings 16 and 18 shown in FIG. 1 so as to raise the upper leg portions 30 and 32 respectively. The inclined camming surfaces 46 and 48 of these jaws wedge the upper head leg portion 30 and 32 of the fastener upwardly to form the triangularly shaped openings indicated generally at 16 and 18 in FIG. 3. It will be apparent that the lower surfaces of the jaws, indicated generally at 50 and 52 engage the lower head leg portions 34 and 36 to urge these into contact with the uppermost surface of the panel 10 during this raising or lifting process for pulling the inner shank portion defined by the legs 20 and 22 upwardly and to assure a positive anchoring engagement between the outer shank leg portions 26 and 28 against the underside of the panel 10 and more particularly the opening defining portion thereof. While the pliers shown in FIG. 2 has been found especially suitable for manual setting of the fastener, it will be apparent that the other mechanized means might be adapted for setting the fasteners on an assembly line basis.

I claim:
1. A pull type blind fastener made from a blank of sheet material originally substantially rectangular, said fastener having a medial portion which defines a generally triangular depending nose, inner shank leg portions extending upwardly from said triangular nose portion, and a head portion including pullable tab portions connected to said inner shank leg portions, said head portion including depending terminal outer shank leg portions extending downwardly alongside said inner shank leg portions for engagement by said nose portion when the latter is pulled upwardly by lifting of said tab portions, and a pair of upper leg portions which define said pullable tab portions, said head portion further including a corresponding pair of lower leg portions which connect the upper head leg portions to said terminal outer shank leg portions respectively, said upper and lower pairs of head leg portions defining a pair of openings therebetween for receiving a camming tool useful in lifting said tab portions.

2. A fastener as defined in claim 1 wherein said depending nose portion includes a blunt lower portion and upwardly and inwardly inclined side portions connected at their lower ends to said lower portion and connected at their upper ends to said inner shank by portions as aforesaid.

3. A pull type blind fastener comprising an initially flat blank of rectangular sheet material, said fastener having a medial portion which defines a depending nose having upwardly and inwardly inclined side portions connected at their lower ends to a blunt lower portion, inner shank leg portions extending upwardly from said nose side portions, a head portion with upper and lower legs so formed as to provide two openings for receiving a tool for pulling said nose upwardly, and depending terminal outer shank leg portions extending downwardly from said lower pair of head leg portions and located alongside said inner shank leg portions for engagement by said upwardly pullable nose portion so as to be cammed outwardly thereby to set the fastener.

4. A fastener as defined in claim 3 wherein said upper and lower legs of said head portion define two laterally elongated openings for receiving a camming tool or the like.

5. A fastener as defined in claim 4 wherein said inner shank leg portions have upper segments which cooperate with said head leg portions to define trangular openings after the fastener has been set.

6. A fastener as defined in claim 3 wherein said nose portion is generally triangular in shape with said side portions being inclined with respect to the axis of the fastener shank portion to spread said outer shank leg portions as aforesaid.

References Cited

UNITED STATES PATENTS

| 1,230,876 | 6/1917 | Doerschuk | 85—8.1 |
| 1,785,622 | 12/1930 | Goodwin | 85—8.1 |
| 1,859,898 | 5/1932 | Taylor | 85—85 |
| 2,597,344 | 5/1952 | Lang | 85—37 |
| 2,850,936 | 9/1958 | Poupitch | 85—37 |

MARION PARSON, Jr., Primary Examiner

U.S. Cl. X.R.

85—8.1, 37